(12) United States Patent
Catoen et al.

(10) Patent No.: US 8,715,547 B2
(45) Date of Patent: May 6, 2014

(54) CLOSED LOOP CONTROL OF AUXILIARY INJECTION UNIT

(75) Inventors: Bruce Catoen, Georgetown (CA); Scott Gammon, Guelph (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 119 days.

(21) Appl. No.: 13/034,165

(22) Filed: Feb. 24, 2011

(65) Prior Publication Data

US 2012/0217668 A1    Aug. 30, 2012

(51) Int. Cl.
  *B29C 45/22*    (2006.01)
  *B29C 45/76*    (2006.01)

(52) U.S. Cl.
  USPC ................ 264/40.1; 264/40.7; 264/328.8

(58) Field of Classification Search
  USPC .......... 264/40.1, 40.5, 40.6, 40.7, 255, 328.8
  See application file for complete search history.

(56) References Cited

U.S. PATENT DOCUMENTS

| | | | |
|---|---|---|---|
| 3,894,823 A | 7/1975 | Hanning | |
| 5,055,026 A | 10/1991 | Gordon | |
| 5,186,954 A | 2/1993 | Masaaki | |
| 5,919,492 A | 7/1999 | Tarr | |
| 5,922,255 A * | 7/1999 | McLeod | 264/40.1 |
| 6,062,840 A | 5/2000 | Lee et al. | |
| 6,090,318 A | 7/2000 | Bader | |
| 7,071,449 B2 * | 7/2006 | Godwin et al. | 219/426 |
| 7,585,166 B2 * | 9/2009 | Buja | 425/143 |
| 7,644,620 B2 | 1/2010 | Bader | |
| 7,651,644 B2 | 1/2010 | Nahill et al. | |
| 7,662,319 B2 * | 2/2010 | Kong | 264/40.1 |
| 7,682,535 B2 | 3/2010 | Frey | |
| 2003/0012837 A1 | 1/2003 | Siano | |
| 2004/0051195 A1 | 3/2004 | Okamura et al. | |
| 2004/0084794 A1 | 5/2004 | Frey | |
| 2004/0121034 A1 | 6/2004 | McBain | |
| 2004/0222209 A1 | 11/2004 | Godwin et al. | |

(Continued)

FOREIGN PATENT DOCUMENTS

| | | |
|---|---|---|
| DE | 20010545 | 9/2000 |
| DE | 202007008390 | 11/2007 |

(Continued)

OTHER PUBLICATIONS

Advanced Molding Technologies Portable Injection Units, Universal Multishot Systems, Jul. 2009.

(Continued)

*Primary Examiner* — Jill Heitbrink
(74) *Attorney, Agent, or Firm* — Medler Ferro PLLC

(57) ABSTRACT

A method and apparatus of controlling commencement of an injection of a melt stream of moldable material from an auxiliary injection unit. A sensor is placed in an injection molding system to sense a condition related to an injection of a first melt stream of a first moldable material provided by a primary injection unit. Commencement of a second melt stream of a second moldable material from the auxiliary injection unit is initiated upon the sensed condition related to the injection of the first melt stream being detected at a preselected value. The sensed condition may be a pressure, velocity or temperature of the first melt stream as provided by a direct sensor, a force or strain on a hot runner component as provided by an indirect sensor or the occurrence of a function of the injection molding system as provided by a functional sensor.

22 Claims, 6 Drawing Sheets

(56) References Cited

U.S. PATENT DOCUMENTS

| | | | |
|---|---|---|---|
| 2006/0202370 A1 | 9/2006 | Bader | |
| 2007/0278708 A1* | 12/2007 | Nahill et al. | 264/40.3 |
| 2008/0039969 A1 | 2/2008 | Liu et al. | |
| 2008/0088047 A1 | 4/2008 | Trudeau | |
| 2008/0107764 A1* | 5/2008 | MacDonald et al. | 425/190 |
| 2008/0230937 A1 | 9/2008 | Bader | |
| 2009/0043454 A1* | 2/2009 | Kong | 701/45 |
| 2009/0278274 A1 | 11/2009 | Bader | |
| 2010/0252944 A1 | 10/2010 | Bader | |

FOREIGN PATENT DOCUMENTS

| | | |
|---|---|---|
| EP | 794046 | 10/2002 |
| EP | 1237702 | 4/2004 |
| EP | 1 612 027 B1 | 1/2012 |
| JP | 4112020 | 4/1992 |
| JP | 201058299 | 3/2010 |
| JP | 2010131812 | 6/2010 |
| WO | WO-9936244 | 7/1999 |
| WO | WO-2007/140447 | 12/2007 |
| WO | WO-2010017970 | 2/2010 |

OTHER PUBLICATIONS

Keba and Priamus Send the Same Signals, KEBA AG, www.keba.com, Oct. 1, 2008.

Keeping-Up with Injection Molding, Plastics Technology, www.PTOnline.com, Nov. 2008.

Multi-component moulding—with your exisiting machine . . . , Babyplast, www.babyplast.net, Publ. Date: unknown, Date Received: Nov. 23, 2010.

Priamus and Sumitomo Demag, Priamus System Technologies AG, www.k-online.de, Oct. 18, 2010.

RJG eDART Installation Quick Start Guide, www.rjginc.com, Publ. Date: unknown, Date Received: Nov. 23, 2010.

State of the Tech: Sensor-based process control, Injection Molding, pp. 43-48, Mar. 2008.

Sustainable Injection Technology, Plasdan Automation and Systems, www.plasdan.pt, Publ. Date: unknown, Date Received: Jan. 3, 2011.

International Search Report and Written Opinion, Int'l Appl. No. PCT/CA2012/000168, May 23, 2012.

* cited by examiner

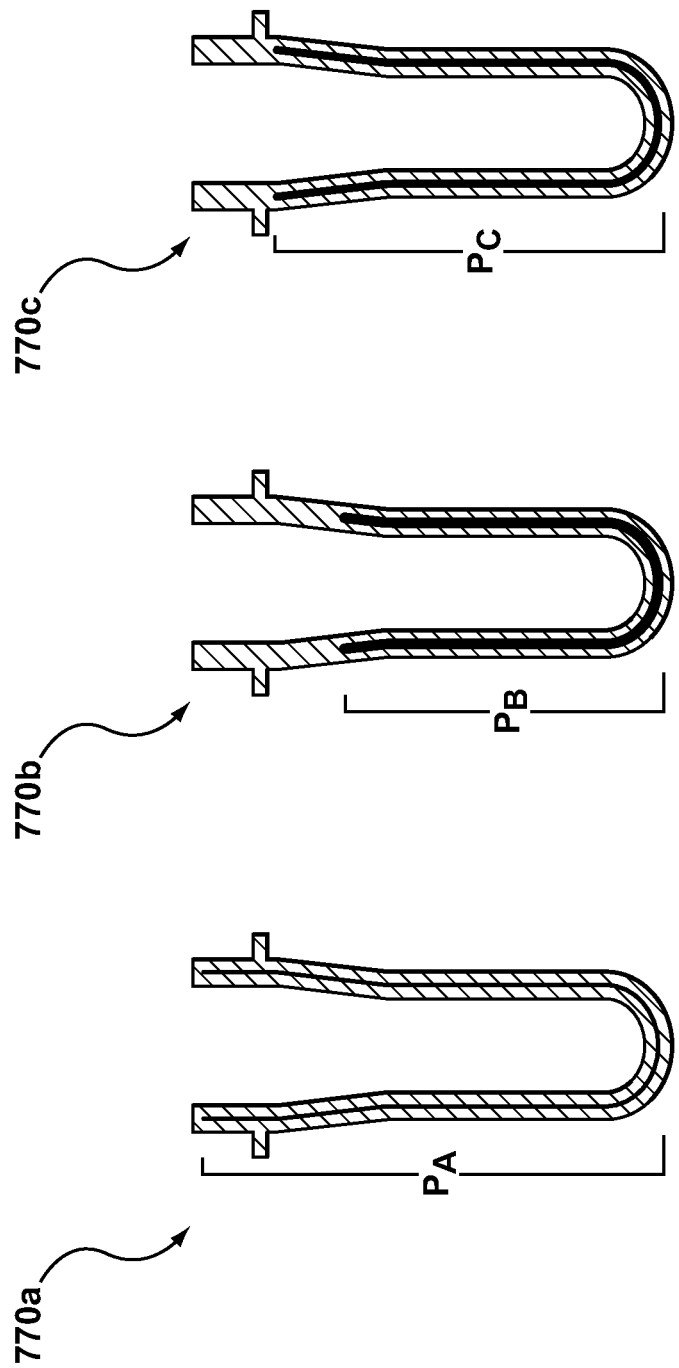

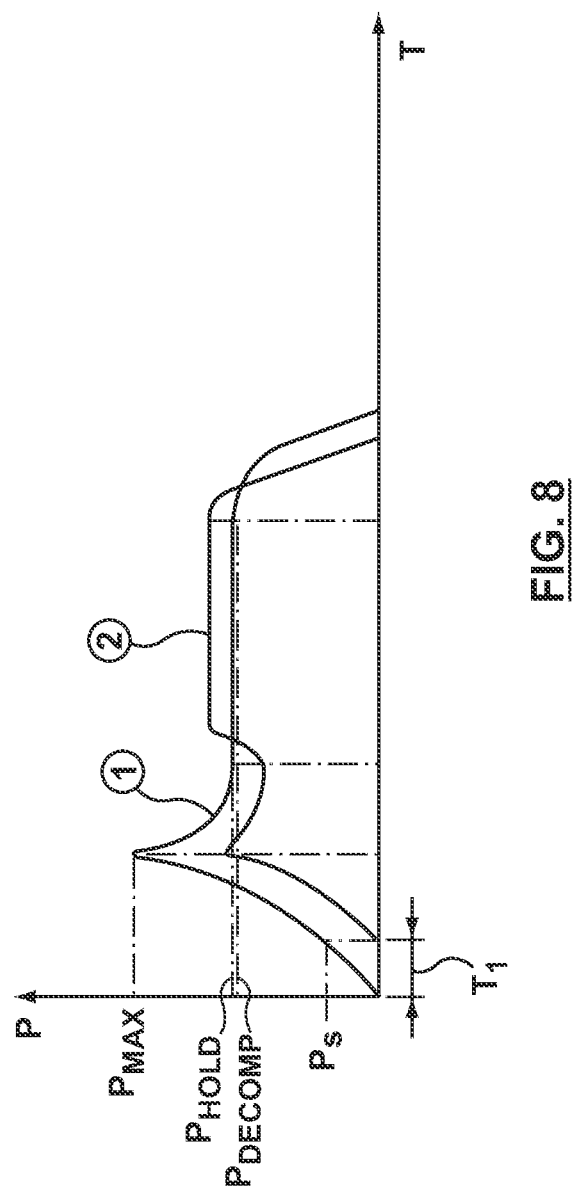

CLOSED LOOP CONTROL OF AUXILIARY INJECTION UNIT

FIELD OF THE INVENTION

The invention relates generally to injection molding systems that have an auxiliary injection unit for co-injection or multi-material applications. More particularly, the invention relates to closed loop control of the auxiliary injection unit.

BACKGROUND OF THE INVENTION

It is known in the art of injection molding to simultaneously or sequentially inject two melt streams of moldable material into a mold cavity using a single hot runner injection molding nozzle, which is commonly referred to as co-injection. A first melt stream of a first moldable material may be provided by an injection molding machine, which may be referred to as a primary injection unit, while a second melt stream of a second moldable material may be provided by an auxiliary injection unit. The first and second melt streams are fed from their respective injection units into respective, separate first and second melt channels or runners of a manifold that are likewise in fluid communication with respective, separate first and second melt channels of the nozzle through which the melt streams are directed to the mold cavity.

During a co-injection molding operation, controlling the flow of each of the first and second melt streams into the mold cavity is crucial in order to produce consistent multi-layer parts. Conventionally, open loop control of the molding process has been provided by which a signal or such may be sent by the primary injection unit to the auxiliary injection unit, the receipt of which triggers commencement of the injection of the second melt stream by the auxiliary injection unit. The trigger signal may be set-up to permit sequential or simultaneous injection of the first and second melt streams by the primary and auxiliary injection units. The drawback of open loop control is that it provides no mechanism by which the actual molding conditions presented by the flow of the first melt stream injected by the primary injection unit may influence the commencement, speed and/or pressure of the flow of the second melt stream injected by the auxiliary injection unit. Without such real time closed loop control of the auxiliary unit injection, co-injected molded parts may be produced that have layers with inconsistent thicknesses and/or improper/undesirable relative positioning.

Multi-material molding is another type of molding operation in which a primary injection unit as well as an auxiliary injection unit are used to supply the material required to make products, such as, toothbrushes that have a handle made of a first harder material and a gripping surface of a second softer material, and automotive lenses that have a first color portion, e.g., a clear material, forming the main portion of the lens that has a void into which a second color portion, e.g., of an amber material, is molded. These types of multi-material molding applications may use a retracting core, called a "core pull" to create a void into which the second material is injected. Other multi-material operations may use a rotary moving platen with multiple molding stations that mold various features onto a single product as each station engages with a stationary half of the mold. In addition, spin stack molding in which a center block of a stack mold "flips" or rotates to engage different faces of the center block with a stationary half of the mold to define different features of the part being molded is another way multi-material overmolding is performed. In each multi-material application, a first melt stream of a first moldable material may be provided by an injection molding machine, while a second melt stream of a second moldable material may be provided by an auxiliary injection unit, such that, similar to the co-injection molding operation described above, controlling the flow of each of the first and second melt streams into the respective mold cavity is crucial in order to produce consistent multi-material or co-injected molded parts.

As such, a need exists in the art for an injection molding system that provides real time communication of a condition of a first melt stream from a primary injection unit to provide synchronized or slaved injection of a second melt stream from an auxiliary injection unit.

BRIEF SUMMARY OF THE INVENTION

Embodiments hereof are directed to a method and apparatus for controlling commencement of an injection of a melt stream of moldable material from an auxiliary injection unit. In an embodiment, a sensor is positioned in an injection molding system to sense a condition related to an injection of a first melt stream of a first moldable material provided by a primary injection unit. Commencement of a second melt stream of a second moldable material from the auxiliary injection unit is initiated upon the sensed condition related to the injection of the first melt stream being detected at a preselected value, wherein the sensed condition may be a pressure, velocity or temperature of the first melt stream as provided by a direct sensor, a force or strain on a hot runner component as provided by an indirect sensor, or the occurrence of a function of the injection molding system as provided by a functional sensor. In embodiments hereof, upon the sensed condition reaching the preselected value, a signal is sent that either directly or indirectly via a time delay commences the injection of the second melt stream from the auxiliary injection unit.

BRIEF DESCRIPTION OF DRAWINGS

The foregoing and other features and advantages of the invention will be apparent from the following description of embodiments thereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIGS. 7A-7C depict exemplary preforms molded by co-injection methods described in embodiments hereof.

FIG. 8 depicts a graph showing the relationship between a pressure or velocity of an injection of a first melt stream of moldable material from a primary injection unit and a pressure or velocity of an injection of a second melt stream of moldable material from an auxiliary injection unit over time having injection stage feedback adjustment as may be provided by the system of FIG. 1 in accordance with a simultaneous co-injection embodiment hereof.

DETAILED DESCRIPTION OF THE INVENTION

Specific embodiments are now described with reference to the figures. The following detailed description is merely exemplary in nature and is not intended to limit the invention or the application and uses of the invention. In the following description, "downstream" is used with reference to the direction of mold material flow from an injection unit to a mold cavity of an injection molding system, and also to the order of components or features thereof through which the mold material flows from an injection unit to a mold cavity, whereas "upstream" is used with reference to the opposite direction. Although the description of embodiments hereof is in the context of co-injection and multi-material applications of a hot runner injection molding systems, the invention may also be used in other molding arrangements where it is deemed useful. Furthermore, there is no intention to be bound by any expressed or implied theory presented in the preceding technical field, background, brief summary or the following detailed description.

Figure 1:
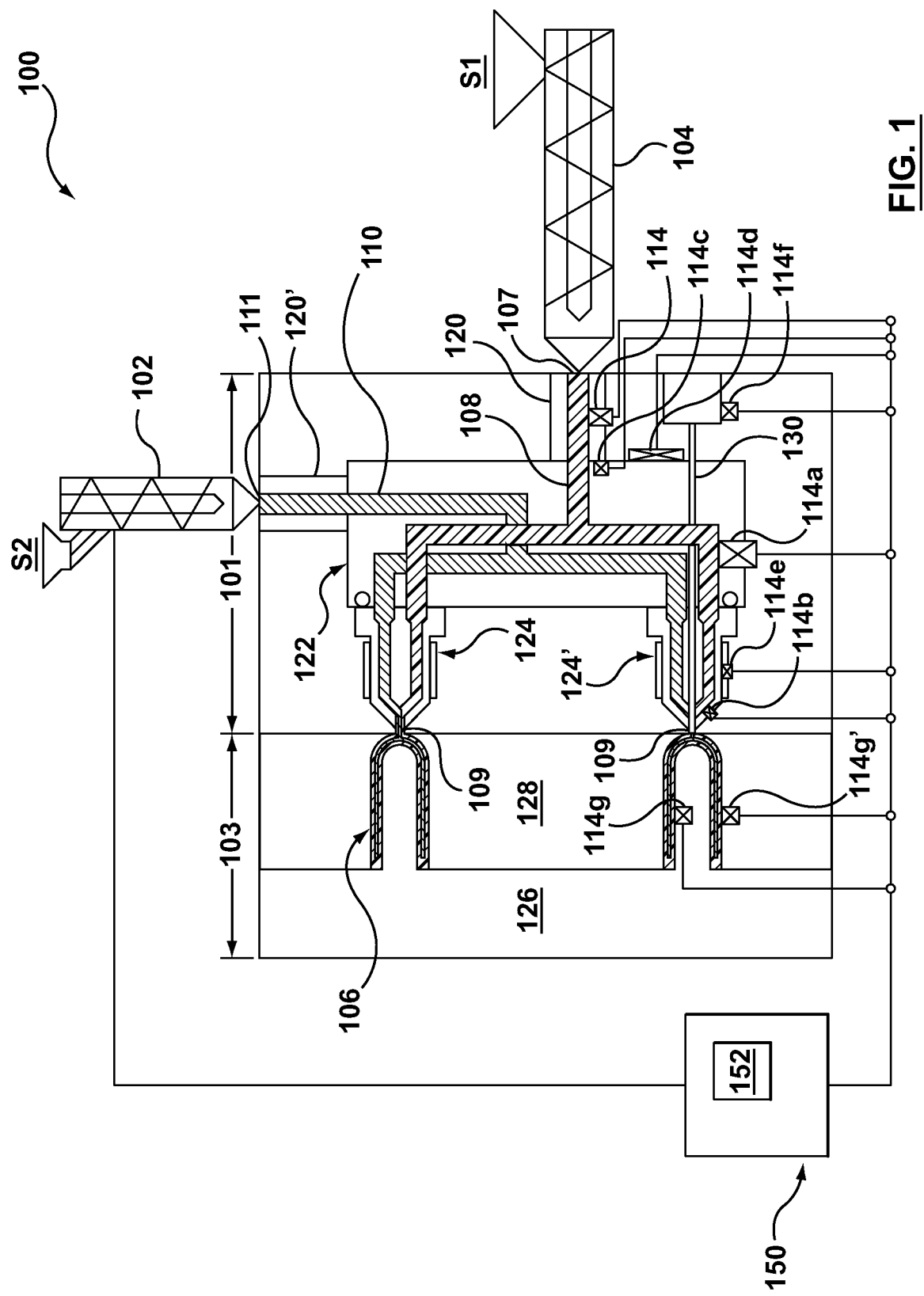
FIG. 1 is a schematic representation of a co-injection molding system having closed loop control of an auxiliary injection unit in accordance with an embodiment hereof.

FIG. 1 is a schematic representation of an injection molding system 100. Injection molding system 100 includes a hot half 101 for directing melt from two separate melt sources S1, S2 to one or more mold cavities 106 formed between hot half 101 and a cold half 103. As such, injection molding system 100 is a co-injection system that includes a primary injection unit 104 for providing a first melt stream of a first moldable material S1 to a mold cavity 106 and an auxiliary injection unit 102 for providing a second melt stream of a second moldable material S2 to mold cavity 106. In accordance with an embodiment hereof, injection molding system 100 includes closed loop control of auxiliary injection unit 102 as described below. In an embodiment, primary injection unit 104 is an injection molding machine and auxiliary injection unit 102 is an auxiliary injection unit that either is coupled to the injection molding machine or a mold held thereby or is disposed on a floor stand positioned next to the machine. In an alternate embodiment, an injection molding system in accordance herewith includes closed loop control of multiple auxiliary injection units.

Primary injection unit 104 feeds the first melt stream into a first set of hot runners or melt channels 108 of injection molding system 100 that extend between a first inlet 107 and a mold gate 109 of mold cavity 106 within hot half 101. Auxiliary injection unit 102 feeds the second melt stream into a second set of hot runners or melt channels 110 of injection molding system 100 that extend between a second inlet 111 and mold gate 109 of mold cavity 106 within hot half 101. It would be understood by one of ordinary skill in the art that the first and second sets of hot runners 108, 110 are melt channels that may extend within or be defined by various hot runner components, such as inlet or sprue bushings 120, 120', one or more manifolds such as manifold 122, and a thermal or valve-gated nozzle such as thermally gated nozzle 124 or valve-gated nozzle 124', and that each of the first and second melt streams separately flows through the various hot runner components to meet proximate of or within mold cavity 106. Although a portion of first and second melt channels 108, 110 are shown as extending within a single manifold 122 this is by way of illustration and not limitation. It would also be understood by one of ordinary skill in the art that system 100 is shown with only two mold cavities 106 for simplicity and that more or fewer mold cavities 106 may be positioned to receive the first and second melt streams provided thereby depending on the type and number of molded articles being produced and that an actual injection molding system based on system 100 may have all thermally gated nozzles 124 or all valve-gated nozzles 124' and not one or more of each as depicted by way of illustration in FIG. 1.

A sensor 114 is utilized within injection molding system 100 to allow closed-loop operation between primary injection unit 104 and auxiliary injection unit 102. In the embodiment shown in FIG. 1, sensor 114 is attached proximate to first inlet 107 of the first set of runners 108. Sensor 114 is a direct melt stream sensor mounted to be in direct contact with the first melt stream flowing through runners 108 to directly monitor a condition of the melt flowing therethrough. Sensor 114 may be selected to monitor a condition of the melt stream such as the pressure, temperature, or velocity of the first melt stream as it flows through the first set of runners 108. In an embodiment, sensor 114 is one of a pressure or velocity sensor placed within first set of hot runners 108 to obtain a direct reading of a respective condition of the first melt stream such as the pressure or velocity of the melt injected by primary injection unit 104. In another embodiment, the sensor is a temperature sensor placed within first set of hot runners 108 to obtain a direct reading of a condition of the first melt stream such as a change in temperature attributed to shear heating of the melt as it flows through first set of hot runners 108 as a result of injection of melt by primary injection unit 104. In FIG. 1, the location shown for sensor 114 generally corresponds to a position along a melt channel of respective melt inlet or sprue bushing 120. In alternate embodiments hereof that are also shown in FIG. 1, sensor 114 may be disposed anywhere along the melt path of the first melt stream as it flows within hot half 101 to include along a melt channel of manifold 122, as represented by sensor 114$a$, or a melt channel of nozzle 124', as represented by sensor 114$b$. In another embodiment, a direct melt stream sensor is one of sensors 114$g$, 114$g'$ located on core plate 126 or cavity plate 128, respectively, in order to obtain a direct reading of the respective condition of the melt within mold cavity 106 during injection.

In another embodiment, an indirect sensor such as a force/strain gauge located at a point along an outer surface of a hot runner component may be used in system 100 to provide closed-loop operation between primary injection unit 104 and auxiliary injection unit 102. Sensor 114d that is shown mounted on manifold 122 and sensor 114e that is shown mounted on nozzle 124' are indirect sensors in so much as they are disposed on an exterior surface of a hot runner component such as a nozzle, manifold, or inlet extension/sprue bushing to indirectly detect a condition of the first melt stream that is exhibited as a measurable movement or change in the respective hot runner component. The measurable movement of the component, which may be a minor distortion or flexing of the injection molding system that occurs as a result of the pressurization of melt within first set of runners 108, is the sensed condition detected by indirect sensor 114d, 114e that would indirectly indicate the condition of the first melt stream being injected by primary injection unit 104 without having to directly sense the condition of the first melt stream.

In another embodiment, a functional sensor disposed within injection molding system 100 that detects the occurrence of a function within injection molding system 100 may be used to provide closed loop operation between primary injection unit 104 and auxiliary injection unit 102. An example of a functional sensor includes a valve pin actuator position sensor 114f associated with valve-gated nozzle 124'. Position sensor 114f is disposed within system 100 to monitor a function such as the activity of a valve pin actuator and subsequently a valve pin 130 coupled thereto as the actuator cycles between open and closed positions for controlling the flow of the first melt stream provided by primary injection unit 104 into mold cavity 106. As such, the sensed condition detected by functional sensor 114f may be the movement of the valve pin actuator to a preselected position such as an open or closed position.

Another example of a functional sensor includes a force/strain gauge mounted on or between the hot runner components of hot half 101, such as sensor 114c that is shown mounted on sprue bushing 120 proximate manifold 122. Sensor 144c measures or senses the force of a machine nozzle being brought into contact with sprue bushing 120. The location of sensor 114c shown in FIG. 1 may be particularly beneficial in certain injection molding applications in which the machine nozzle/carriage of primary injection unit 104 is retracted from hot runner inlet 107 between each injection cycle. In another embodiment, sensor 114c may be mounted on sprue bushing 120 proximate inlet 107. Examples of these types of injection molding applications include the molding of thin wall items and/or stack molding. In such applications when the mold is opened in order to eject parts, the machine nozzle is retracted from inlet 107 to decompress the system so that melt drool from thermal gated nozzles 124 is minimized and/or to relieve shock on the hot runner system during closure of the mold. In order to commence the next injection cycle the mold is closed, wherein the machine nozzle is brought into contact with hot runner inlet 107, which is the sensed condition detected by functional sensor 114c, and the injection cycle of primary injection unit 104 commences.

Each of the above sensor locations as represented by sensors 114, 114a-114g, 114g' would be suitable for co-injection molding applications such as those used to mold a plastic bottle preform (as shown in mold cavity 106) where there is a middle layer of a barrier material provided by auxiliary injection unit 102 that is positioned between inner and outer layers of a skin material provided by primary injection unit 104.

In general, an injection of the first melt stream is commenced by primary injection unit 104 and a condition of the melt flowing through the first set of runners 108 is monitored (either directly or indirectly) as described above by at least one of sensors 114, 114a, 114b, 114d, 114e, 114g, 114g'. In addition, one or more functions of injection molding system may instead or concurrently be monitored as described above by at least one of sensors 114c and 114f. Continuous monitoring of the condition of the melt and/or functions of injection molding system 100 by one of sensors 114-114g' permits auxiliary injection unit 102 to be slaved, in real time, to the actual output of primary injection unit 104. More particularly, when a preselected value for the sensed condition (direct or indirect) of the first melt stream is reached, and/or the occurrence of a function of injection molding system occurs, a signal is sent to a controller 150 of auxiliary injection unit 102 to commence injection of the second melt stream relative to an actual time, speed, and/or pressure of the first melt stream. In an alternate embodiment in an injection molding system in accordance herewith, when a preselected value for the sensed condition (direct or indirect) of the first melt stream is reached, and/or the occurrence of a function of injection molding system occurs, a signal is sent to multiple controllers 150 of respective auxiliary injection units 102 to commence injection of respective melt streams therefrom relative to an actual time, speed, and/or pressure of the first melt stream.

In an embodiment, when a preselected value for the sensed condition (direct or indirect) of the first melt stream is reached and/or the occurrence of a function of injection molding system occurs, a signal is sent to controller 150 which will then start a timer 152 to delay injection of the second melt stream by auxiliary injection unit 102 by a preset time period. The slaving of the commencement of the injection of the second melt stream provided by auxiliary injection unit 102 to the sensed condition(s) of the first melt stream by primary injection unit 104 ensures that the start of the second melt stream is related to an actual time, speed, and/or pressure of the first melt stream.

Figure 2:
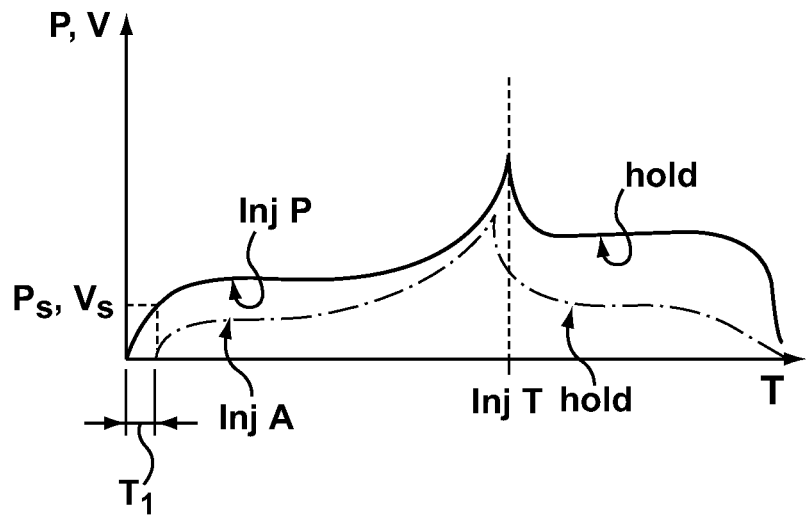
FIG. 2 depicts a graph showing the relationship between a pressure or velocity of an injection of a first melt stream of moldable material from a primary injection unit and a pressure or velocity of an injection of a second melt stream of moldable material from an auxiliary injection unit over time as may be provided by the system of FIG. 1 in accordance with a simultaneous co-injection embodiment hereof.

FIG. 2 is a graph showing the relationship between a pressure "P" or velocity "V" of the first melt stream of moldable material from primary injection unit 104 ("Inj P") and a pressure "P" or velocity "V" of the second melt stream of moldable material from auxiliary injection unit 102 ("Inj A") over time "T" as may be provided by the system of FIG. 1 in accordance with a simultaneous co-injection embodiment hereof. Features and aspects of the other embodiments may be used accordingly with the current embodiment. In this embodiment, when Inj P reaches a preselected pressure value $P_S$ or preselected velocity value $V_S$ as sensed by one of direct sensor 114, 114a, 114b, 114g, 114g', a signal will be provided to controller 150 of auxiliary injection unit 102 to start Inj A. A delay of a time period "$T_1$" occurs between commencement of Inj P and commencement of Inj A that corresponds to the time it takes the pressure P or velocity V of melt in the first melt stream to reach the preselected pressure value $P_S$ or preselected velocity value $V_S$. Inj P and Inj A continue for a time period "Inj T." Thereafter Inj P and Inj A are held over a sufficient time period to allow packing of mold cavity 106. It would be understood by one of skill in the art that injection pressure and velocity depend on shape, size and number of parts being molded and resins being used to mold the part. As well total injection time is not a set time but varies dependent on such variables as screw movement as well as shape, size and number of parts being molded.

Referring to FIGS. 1 and 2 in the simultaneous co-injection embodiment described above, when the preselected value of the sensed condition of the first melt stream is detected by at least one of direct sensor 114, 114a, 114b, 114g, 114g', the sensor sends a signal to controller 150 that directly triggers commencement of the auxiliary unit 104. In another embodiment when the preselected value of the sensed condition of the first melt stream is detected by at least one of direct sensor 114, 114a, 114b, 114g, 114g', the sensor sends a signal to controller 150 that triggers timer 152 that subsequently triggers commencement of auxiliary unit 104 after passage of a preset time period. Similarly, indirect sensors 114d, 114e may be used to indirectly detect the start of melt flow from primary injection unit 104 by sensing a preselected value of force or strain on a hot runner system component at which time a signal would be sent to controller 150 that would start melt flow from auxiliary injection unit 104 at a time, speed, and pressure relative to the first melt stream either immediately or after expiration of timer 152.

Figure 3:
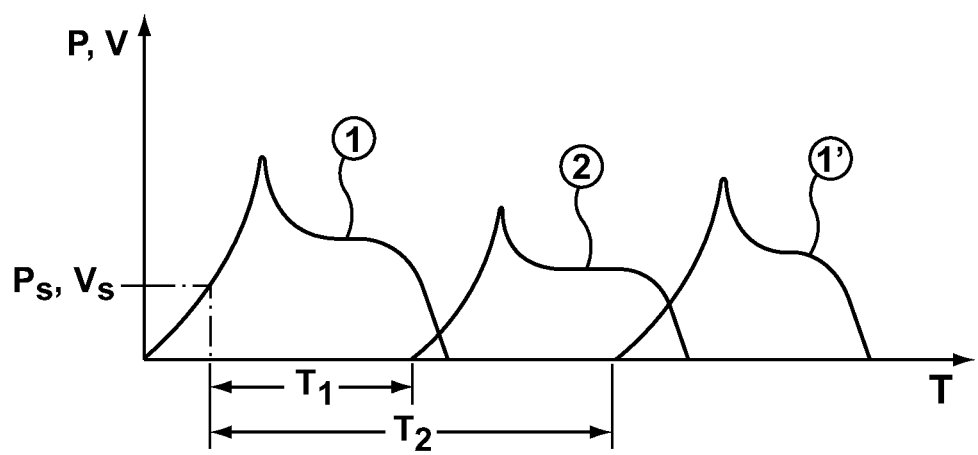
FIG. 3 depicts a graph showing the relationship between a pressure or velocity of an injection of a first melt stream of moldable material from a primary injection unit and a pressure or velocity of an injection of a second melt stream of moldable material from an auxiliary injection unit over time as may be provided by the system of FIG. 1 in accordance with a sequential co-injection embodiment hereof.

FIG. 3 depicts a graph showing the relationship between a pressure P or velocity V of a first melt stream of moldable material from primary injection unit 104 during a first and second injection cycle, represented by injection cycle profiles (1), (1'), and a pressure P or velocity V of a second melt stream of moldable material from auxiliary injection unit 102 during an auxiliary injection cycle, represented by injection cycle profile (2), over time T as may be provided by system 100 of FIG. 1 in accordance with a sequential co-injection embodiment. Features and aspects of the other embodiments may be used accordingly with the current embodiment. The depicted sequential injection cycle profiles (1), (1') and (2) shown in FIG. 3 are suitable for forming a molded article, such as, for example, a preform, having inner and outer layers of a first material provided by primary injection unit 104 and a middle or barrier layer of a second material provided by auxiliary injection unit 102. In this embodiment, when a first injection of the first material from primary injection unit 104 reaches a preselected pressure value "$P_S$" or preselected velocity value "$V_S$" as sensed by at least one of direct sensor 114, 114a, 114b, 114g, 114g', and as noted on injection cycle profile (1) that depicts the first injection of an inner or outer layer of the molded article, than a signal will be provided that actuates timer 152. After passage of a preset time period "$T_1$" that, in the current nonlimiting embodiment, ends just prior to the completion of the first injection, an injection of the second material from auxiliary injection unit 102 commences, which is depicted by injection cycle profile (2), to provide the middle or barrier layer of the molded article. In turn, after passage of a second time period "$T_2$" that ends just prior to the completion of the injection of the second material, the second injection of the first material from primary injection unit 104 is commenced, which is depicted by injection cycle profile (1'), to provide an outer or inner layer of the molded article.

Figure 4:
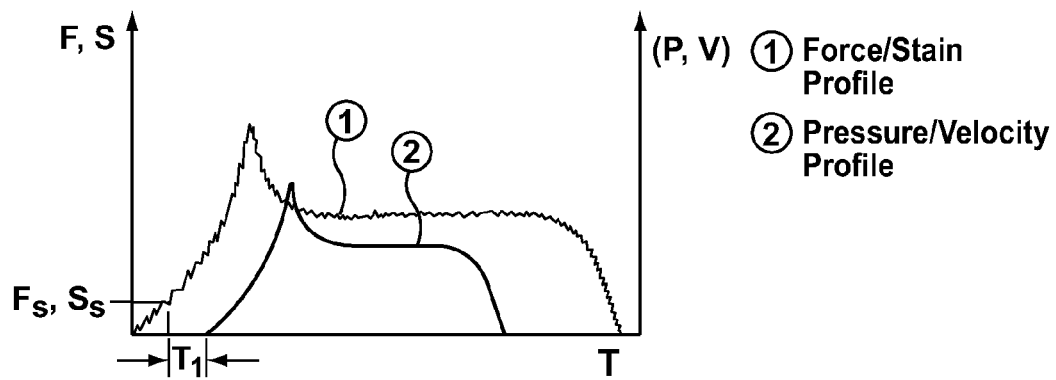
FIG. 4 depicts a graph showing the relationship between the force/strain of an injection of a first melt stream of moldable material from a primary injection unit on a hot runner component, and a pressure or velocity of an injection of a second melt stream of moldable material from an auxiliary injection unit over time as may be provided by the system of FIG. 1 in accordance with another simultaneous co-injection embodiment hereof.

FIG. 4 depicts a graph showing the relationship between the force/strain (F/S) profile experienced by a hot runner component in injection molding system 100 due to an injection from primary injection unit 104, which is represented by injection cycle profile (1), and a pressure or velocity profile of a second melt stream of moldable material from auxiliary injection unit 102, represented by injection cycle profile (2), over time T as may be provided by the system of FIG. 1 in accordance with a simultaneous co-injection embodiment. The depicted simultaneous co-injection profiles in FIG. 4 are suitable for forming a molded article, such as, for example, a preform, having an inner and outer layer of a first material provided by primary injection unit 104 and a middle or barrier layer of a second material provided by auxiliary injection unit 102.

In the embodiment of FIG. 4, an injection of the first material from primary injection unit 104 produces a measurable amount of force/strain on injection molding system 100 which is exhibited as flex or distortion in one or more of inlet component 120, manifold 122, and nozzle 124. When an indirect sensor, such as a strain gauge, disposed on the respective surface thereof detects a preselected amount of force "$F_S$" or strain "$S_S$," as noted on injection cycle force/strain profile (1), which corresponds to the injection of a first melt stream of a first material that will form an inner and outer layer of the molded article, than a signal will be provided to controller 150 that actuates timer 152. After passage of a preset time period $T_1$, an injection of a second melt stream of a second material from auxiliary injection unit 102 commences, which is depicted by injection cycle pressure/velocity profile (2), to provide the middle or barrier layer of the molded article.

In embodiments of FIGS. 2-4 generally, the signal is sent to controller 150 of auxiliary injection unit 102 as the monitored condition of the first melt stream (pressure, velocity, temperature, force, or strain) ascends to a preselected value suitable for initiation of injection of the second melt stream from auxiliary injection unit 102. It would also be understood by one of ordinary skill in the art that the preselected value at which a signal is sent to controller 150 may happen at any point throughout the injection cycle such as when the monitored condition of the first melt stream (pressure, velocity, temperature, force, or strain) ascends to a preselected value, descends to a preselected value, or reaches a maximum or minimum preselected value.

Figure 5:
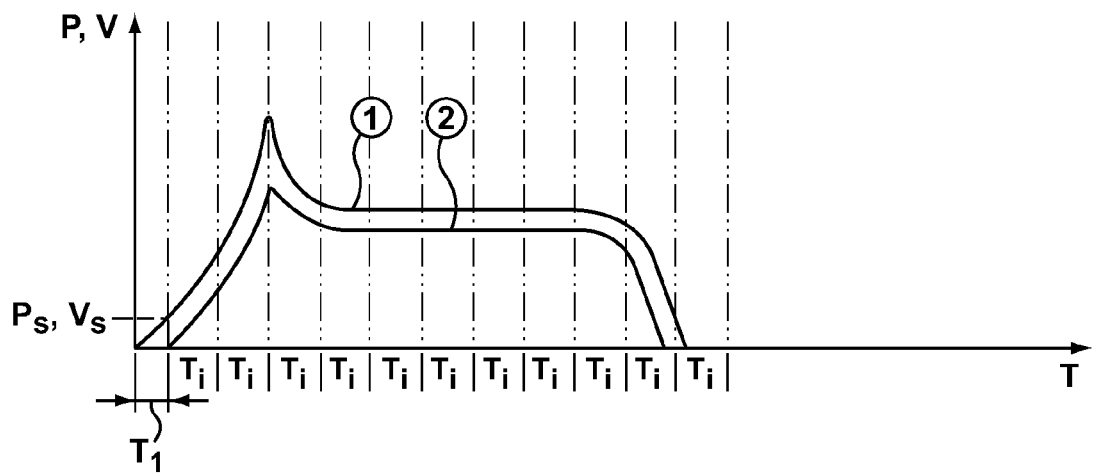
FIG. 5 depicts a graph showing the relationship between a pressure or velocity of an injection of a first melt stream of moldable material from a primary injection unit and a pressure or velocity of an injection of a second melt stream of moldable material from an auxiliary injection unit over time having preset time interval feedback adjustment of the second mold stream as may be provided by the system of FIG. 1 in accordance with a simultaneous co-injection embodiment hereof.

In another embodiment, pressure P or velocity V of the first melt stream provided by primary injection unit 104 may be measured after passage of various intervals of time over the primary injection cycle to provide active adjustment of the auxiliary injection in response to each sensed pressure P or velocity V. FIG. 5 depicts a graph showing the relationship between pressure P or velocity V of the first melt stream of moldable material from primary injection unit 104 represented by injection cycle profile (1) and a pressure P or velocity V of the second melt stream of moldable material from auxiliary injection unit 102, represented by injection cycle profile (2) over time T having active adjustment after each of preset time intervals "$T_i$," as may be provided by the system of FIG. 1 in accordance with a simultaneous co-injection embodiment hereof. Such an embodiment provides preset time interval feedback of a sensed condition of the first melt stream to auxiliary injection unit 102 upon which may be based adjustment of the injection of the second melt stream such as would affect a pressure P or velocity V of the second melt stream. Features and aspects of the other embodiments may be used accordingly with the current embodiment.

Once injection of the first material from primary injection unit 104 reaches a preselected pressure value $P_S$ or preselected velocity value $V_S$ as sensed by at least one of direct sensor 114, 114a, 114b, 114g, 114g', a signal will be provided to controller 150 of auxiliary injection unit 102 to start injection of the second melt stream. A delay of a time period $T_1$ occurs between commencement of injection by primary injection unit 104 and commencement of injection of auxiliary injection unit 102 that corresponds to the time it takes the pressure P or velocity V of melt in the first melt stream to reach the preselected pressure value $P_S$ or preselected velocity value $V_S$. Rather than sending a single signal to auxiliary injection unit 102 regarding when to commence injection of the second melt stream, controller 150 actively monitors the pressure P or velocity V measurements provided by one of direct sensors 114, 114a, 114b, 114g, 114g' after each specified time interval $T_i$, for example after a time interval of 0.1 seconds, starting from time $T_1$ that corresponds to commencement of the auxiliary injection as depicted in FIG. 5. From the commencement of injection by auxiliary injection unit 102, controller 150 takes a direct reading from one of direct sensors 114, 114a, 114b, 114g, 114g' at 0.1 second intervals, for instance, and signals auxiliary injection unit 102 to actively adjust the pressure P or velocity V of the second melt stream as depicted by injection cycle profile (2) in response to the sensed condition of the melt in the first melt stream at each interval as depicted by injection cycle profile (2). Although the second melt stream depicted by injection cycle profile (2) is shown as proportionately adjusted relative to the first melt stream depicted by injection cycle profile (1) this is by way of illustration and not limitation.

Figure 6:
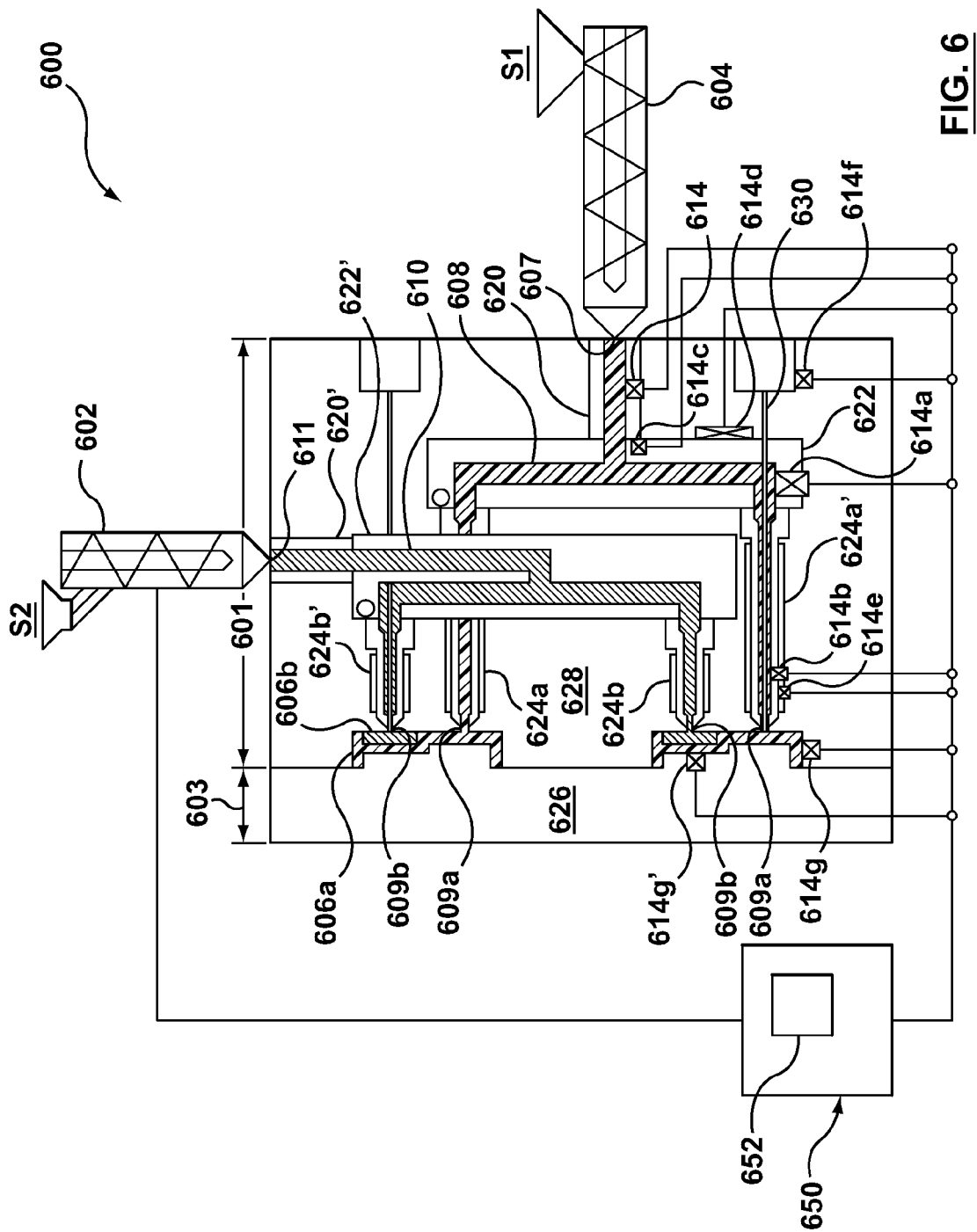
FIG. 6 is a schematic representation of a multi-material injection molding system having closed loop control of an auxiliary injection unit in accordance with another embodiment hereof.

FIG. 6 is a schematic representation of an injection molding system 600. Injection molding system 600 includes a hot half 601 for directing melt from two separate melt sources S1, S2 to one or more mold cavities 606*a*, 606*b* formed between hot half 601 and a cold half 603. Injection molding system 600 is a multi-material injection molding system that includes a primary injection unit 604 for providing a first melt stream of a first moldable material S1 to a mold cavity 606*a* and an auxiliary injection unit 602 for providing a second melt stream of a second moldable material S2 to mold cavity 606*b*, in accordance with an embodiment hereof. Features and aspects of the other embodiments may be used accordingly with the current embodiment. Injection molding system 600 includes closed loop control of auxiliary injection unit 602 as described below. In an embodiment, primary injection unit 604 is an injection molding machine and auxiliary injection unit 602 is an auxiliary injection unit that either is coupled to the injection molding machine or a mold held thereby or is disposed on a floor stand positioned next to the machine.

Primary injection unit 604 feeds the first melt stream into a first set of hot runners or melt channels 608 of injection molding system 600 that extend between a first inlet 607 and a mold gate 609*a* of mold cavity 606*a* within hot half 601. After the mold is rearranged, such as by retracting, rotating or spinning core plate 626 to provide mold cavity 606*b*, auxiliary injection unit 602 feeds the second melt stream into a second set of hot runners or melt channels 610 of injection molding system 600 that extend between a second inlet 611 and mold gate 609*b* of mold cavity 606*b* within hot half 601. It would be understood by one of ordinary skill in the art that the first and second sets of hot runners 608, 610 are melt channels that may extend within or be defined by various hot runner components, such as an inlet or sprue bushings 620, 620', one or more manifolds such as manifold 622, 622', and a thermal or valve-gated nozzle such as thermally gated nozzles 624*a*, 624*b* or valve-gated nozzle 624*a'*, 624*b'* and that each of the first and second melt streams separately flows through the various hot runner components to respective mold cavity 606*a*, 606*b*. Although a portion of first and second melt channels 608, 610 are shown as extending within separate manifolds 622, 622' this is by way of illustration and not limitation. In another embodiment a portion of first and second melt channels 608, 610 extend separately within a single manifold as in the embodiment of FIG. 1. It would also be understood by one of ordinary skill in the art that system 600 is shown with only two mold cavities 606*a*, 606*b* to form only two multi-material parts for simplicity and that more or fewer mold cavities 606*a*, 606*b* (not shown) may be positioned to receive the first and second melt streams provided thereby depending on the type and number of molded articles being produced. As well one of ordinary skill in the art would understand that an actual injection molding system based on system 600 may have all thermally gated nozzles 624*a*, 624*b* or all valve-gated nozzles 624*a'*, 624*b'* and not one or more of each as depicted by way of illustration in FIG. 6.

A sensor 614 is utilized within injection molding system 600 to allow closed-loop operation between primary injection unit 604 and auxiliary injection unit 602. In the embodiment shown in FIG. 6, sensor 614 is attached proximate to first inlet 607 of the first set of runners 608. Sensor 614 is a direct sensor mounted to be in direct contact with the first melt stream flowing through runners 608 to directly monitor a condition of the melt flowing therethrough. Sensor 614 may be selected to monitor a condition of the melt stream such as the pressure, temperature, or velocity of the first melt stream as it flows through the first set of runners 608. In an embodiment, sensor 614 is one of a pressure or velocity sensor placed within first set of hot runners 608 to obtain a direct reading of the respective condition of the first melt stream such as a change in pressure or velocity attributed to injection of melt by the primary injection unit 604. In another embodiment, sensor 614 is a temperature sensor placed within first set of hot runners 608 to obtain a direct reading of the respective condition of the first melt stream such as a change in temperature attributed to shear heating of the melt as it flows through first set of hot runners 608 as a result of injection of the first melt stream by primary injection unit 604. In FIG. 6, the location shown for sensor 614 generally corresponds to a position along a melt channel of respective melt inlet or sprue bushing 620. In alternate embodiments hereof that are also shown in FIG. 6, the direct melt stream sensor may be disposed anywhere along the melt path of the first melt stream as it flows within hot half 601 to include along a melt channel of manifold 622, as represented by sensor 614*a*, or a melt channel of nozzle 624*a'*, as represented by sensor 614*b*.

In another embodiment, the direct melt stream sensor is one of sensors 614*g*, 614*g'* located on core plate 626 or cavity plate 628, respectively, in order to obtain a direct reading of the respective condition of the melt within mold cavity 606*a*, 606*b* during injection.

In another embodiment the sensor may be an indirect sensor such as a force/strain gauge located at a point along an outer surface of a hot runner component, such as sensor 614*d* that is shown mounted on manifold 122 and sensor 614*e* that is shown mounted on nozzle 624*a'*. Sensors 614*d*, 614*e* are indirect sensors in so much as they are disposed on an exterior surface of a hot runner component such as a nozzle, manifold, or inlet extension/sprue bushing to indirectly detect a condition of the first melt stream that is exhibited as a measurable movement or change in the respective hot runner component. The measurable movement of the component, which may be a minor distortion or flexing of the injection molding system that occurs as a result of the pressurization of melt within first set of runners 608, is the sensed condition detected by indirect sensor 614*d*, 614*e* that would indirectly indicate the condition of the first melt stream being injected by primary injection unit 604 without having to directly sense the condition of the first melt stream.

In another embodiment, the sensor may be a functional sensor disposed within injection molding system 600 in order to detect the occurrence of a function within injection molding system 600. An example of a functional sensor includes a valve pin actuator position sensor 614*f* associated with valve-gated nozzle 624*a'* positioned to monitor a function such as the activity of the valve pin actuator and concurrently a valve pin 630 coupled thereto as the actuator cycles between open and closed positions for controlling the flow of melt provided by primary injection unit 604 into mold cavity 606*a*. As such, the sensed condition detected by functional sensor 614*f* may be the movement of the valve pin actuator to a preselected position such as an open or closed position.

Another example of a functional sensor includes a force/strain gauge mounted on the hot runner components of hot half 601, such as sensor 614*c* that is shown mounted on sprue bushing 620 proximate manifold 622 such that the force of a machine nozzle being brought into contact with sprue bushing 620 will be measured by sensor 614c. The location of sensor 614c may be particularly beneficial in certain injection molding applications in which the machine nozzle/carriage of primary injection unit 604 is retracted from hot runner inlet 607 between each injection cycle. In another embodiment, sensor 614c may be mounted on sprue bushing 620 proximate inlet 607. Examples of these types of injection molding applications include the molding of thin wall items and/or stack molding. In such applications when the mold is opened in order to eject parts, the machine nozzle is retracted from inlet 607 to decompress the system so that melt drool from thermal gated nozzle 624a is minimized and/or to relieve shock on the hot runner system during closure of the mold. In order to commence the next injection cycle the mold is closed, wherein the machine nozzle is brought into contact with hot runner inlet 607, which is the sensed condition detected by functional sensor 614c, so that the injection cycle of primary injection unit 604 may begin. Each of the above sensor locations represented by sensors 614, 614a-614g and 614g' would be suitable for a multi-material molding application such as those used in molding automobile lenses, for instance.

A multi-material injection molding application in accordance with embodiment hereof may utilize functional sensor 614f for triggering the injection from auxiliary injection unit 102. More particularly, functional sensor 614f is positioned to monitor the activity of an actuator and concurrently valve pin 630 coupled thereto as the actuator cycles between open and closed positions for controlling the flow of melt provided by primary injection unit 604 into mold cavity 606a. In an embodiment, functional sensor 614f is set to detect the open position of the actuator associated with the first melt stream provided by primary injection unit 604. Upon detecting the actuator shifting to an open position a signal is sent to controller 650 to begin timer 652 for initiation of a preset time period that includes a time period which commences at the completion of the primary injection cycle associated with primary injection unit 604 and during which the mold is altered to create mold cavities 606b, such as by retracting the core or rotating/flipping the mold to align another mold part. After expiration of the preset time period, the secondary injection cycle commences from the auxiliary injection unit 602 to inject the second melt stream into the mold cavities 606b via second set of hot runners 610.

In general for embodiments described herein, one of sensors 114, 114a-114g and 114g' of the embodiment of FIG. 1 and one of sensors 614, 614a-614g and 614g' of the embodiment of FIG. 6, such as a pressure sensor 114, 614 positioned to directly sense a condition of the first melt stream injected by the respective primary injection unit 104, 604, transmits an analog signal (current or voltage, 0-10 v) to a programmable logic controller (PLC) 150, 650 of the respective auxiliary injection unit 102, 602. The PLC 150, 650 has an analog input card to convert the analog signal to a digital signal that will either trigger the auxiliary injection unit 102, 602 to commence an auxiliary injection, as described above, or start timer 152, 652 which will delay the auxiliary injection by a preset time period.

In many cases, due to a lack of a machine language standard in the injection molding industry, each time an auxiliary injection unit is incorporated into an existing injection molding machine there is a certain amount of customization of the injection molding machine controller that is necessary in order to enable communication between the injection molding machine and the auxiliary injection unit. In other cases the auxiliary injection unit is triggered by a EUROMAP signal or an SPI signal provided by the injection molding machine. In either case an amount of customization, which is often time consuming, is involved each time an auxiliary injection unit is hard wired to an injection molding machine in order for the auxiliary injection unit to receive an output signal from the primary injection unit "telling" the auxiliary injection unit when to start. Although under ideal circumstances a start time of an injection cycle by the auxiliary injection unit relative to commencement of the injection cycle of the primary injection unit should be generally constant, if a signal from the machine is relied on for the commencement of injection by the auxiliary injection unit, any variance in the actual injection profile of the primary injection unit relative to the programmed or desired injection profile may result in the auxiliary injection unit commencing either too soon or too late, which may cause inconsistent thicknesses and/or improper/undesirable relative positioning of the two materials within the mold cavity.

An advantage of the use of sensors 114, 114a-114g or 114g' or sensors 614, 614a-614g and 614g' as described in the embodiments above, the auxiliary controller 150, 650 of the auxiliary injection unit 102, 602 need not be hard wired into the machine controller of the primary injection unit 104 providing a savings of time and eliminating the need for customization, thereby making such systems in accordance with embodiments hereof readily adaptable to many injection molding applications.

In an embodiment a safety feedback sensor that can confirm that an injection of the first melt stream by the primary injection unit 104, 604 has actually occurred as a live injection may be useful in embodiments hereof, such as in cases where controller 150, 650 would want to ensure that a live injection cycle had occurred prior to the triggering of the injection by auxiliary injection unit 102, 602. Such a safety feedback sensor would ensure that the auxiliary injection unit 102, 602 would not begin an injection of the second material when it is undesirable to do so. For example, although embodiments hereof contemplate one of sensors 114, 114a-114g or 114g' or sensors 614, 614a-614g and 614g' being used to provide closed-loop control between primary injection unit 104, 604 and auxiliary injection unit 102, 602, two sensors may be used in conjunction with one another with the second sensor serving as the safety feedback sensor. In a non-limiting example, a functional sensor, such as valve pin actuator sensor 114f, 614f, which is used to determine open and closed positions of an actuator, provides a signal to controller 150, 650 that is then used to provide closed-loop control of the auxiliary injection unit 102, 602. Since valve pins can be actuated between open and closed positions at times when no melt is being injected by primary injection unit 104, 604, such as during set-up of injection molding system 100, 600 a safety feedback sensor such as indirect sensor 114e, 614e can be used to monitor the force/strain on nozzle 124, 624 such that auxiliary injection unit 102, 602 is prevented from injecting unless the strain on nozzle 124, 624 meets or exceeds a preset value indicative of a live injection of primary injection unit 104. In such a case, indirect sensor 114e, 614e acts as a safety feedback sensor by confirming that an injection has been initiated.

FIGS. 7A-7C depict molded parts 770a, 770b, 770c formed by an exemplary simultaneous co-injection molding application provided by injection molding system 100 in accordance with embodiments hereof. Features and aspects of the other embodiments may be used accordingly with the current embodiment. During set-up of injection molding system 100 within an injection molding machine (not shown), an operator inputs information associated with making a specific part into both a user interface of a machine controller (not shown) associated with primary injection unit 104 and a user interface of controller 150 associated with auxiliary injection unit 102. FIGS. 7A-7C depict forming 20 gram preforms 770a, 770b, 770c for subsequent blow molding into a beverage container or the like, having an inner and outer layer of Polyethylene Terephthalate (PET) comprising 90% of the total part weight supplied by primary injection unit 104, as well as a barrier layer of Ethylene Vinyl Alcohol (EVOH) comprising the remaining 10% of the total part weight supplied by the auxiliary injection unit 102. In an embodiment, preforms 770a, 770b, 770c are molded in a mold having 32 cavities (not shown) and as such, the operator will provide input to the controller of the injection molding machine that controls primary injection unit 104 to inject a shot volume of 576 grams (18 g×32). The operator will then input into controller 150 to inject a shot volume of 64 grams (2 g×32).

With hot half 101 and cold half 103 of injection molding system 100 urged together between the fixed and movable platen of an injection molding machine as would be understood by one of ordinary skill in the art, a first shot of melt is delivered to mold cavities 106 from primary injection unit 104 via first set of runners 108. As described in the embodiments above, at least one direct sensor 114, 114a, 114b, 114g, and 114g' in communication with controller 150 is positioned to directly sense a condition of the melt related to the injection of the first melt stream by primary injection unit 104. Once at least one direct sensor 114, 114a, 114b, 114g, and 114g' senses a preselected value of the condition of the first melt stream, controller 150 sends a signal to auxiliary injection unit 102 to commence injection. Alternately, upon receiving the signal that the preselected value has been reached, controller 150 will instead start timer 152 which will, after a programmed delay, send a signal to auxiliary injection unit 102 to commence injection. Once primary and auxiliary injection units 104, 102 have delivered their requisite shots of molding material to mold cavity 106, the newly molded articles are cooled within mold 106 until they have sufficiently solidified. Hot half 101 and cold half 103 are then urged apart by the separation of the moving and fixed platen of the injection molding machine, and the newly molded articles are then ejected from the mold. The machine operator will then inspect one or more of the newly molded articles to evaluate the position of the barrier layer within the inner and outer layer.

In an exemplary embodiment the preselected value for commencing injection of the second melt stream by auxiliary injection unit 102 is the detection of a pressure of 15,000 PSI by a direct sensor which corresponds to the start of the first melt stream flow from primary injection unit 104. The preselected value may be adjusted after inspection of the molded preform either by incrementally changing the preselected value for triggering the auxiliary injection by, for example, +/−1000 PSI. or by setting timer 152 for 0.10 second increments to delay the auxiliary injection and thereby control the distribution of the barrier layer within the preform. In an alternate embodiment, a pressure of 10,000 PSI is a preselected value for starting timer 152 that is set for 0.50 seconds, for instance, and then after inspection of the molded preform the timer can be adjusted by, for example, +/−0.1 second increments to control the distribution of the barrier layer within the preform.

If auxiliary injection unit 102 commences injection of melt too soon, there will be an uneven distribution of barrier material as shown by preform 770a in FIG. 7A, wherein the position $P_A$ of the barrier material extends beyond a body of the preform and into a threaded region where it is not needed. Upon viewing this scenario, the operator can provide input to controller 150 to commence injection from the auxiliary injection unit 102 upon sensor 114 sensing a greater preselected value. Alternately, the operator may elect to activate injection-delay timer 152 of controller 150 such that upon sensor 114 reaching the preselected value, timer 152 will delay injection of the second melt stream by auxiliary injection unit 102. Conversely, if injection of the auxiliary injection material begins to late, there will be an uneven distribution in the gate and body region of the preform as shown at $P_B$ of preform 770b in FIG. 7B. In this scenario, the operator can reduce the preselected value at which sensor 114 signals auxiliary injection unit 102 to commence injection. Alternatively, if timer 152 has been used to delay injection after the preselected value is reached, the operator can then reduce the amount of elapsed time before a signal is sent to commence injection by auxiliary injection unit 102. The result of such adjustment capability is that the operator is given control over the commencement of injection by auxiliary injection unit 102 relative to commencement of injection by primary injection unit 104, such that the distribution of barrier material within the inner and outer layer material may be readily adjusted until a desired preform product is produced as shown at $P_C$ of preform 770c in FIG. 7C. Once the preselected value, and if used, the time delay is optimized, the distribution of barrier material within the inner and outer material will generally be consistently maintained through subsequent molding cycles.

FIG. 8 depicts a graph showing the relationship between a pressure P of the first melt stream of moldable material from primary injection unit 104 represented by injection cycle profile (1) and a pressure P of the second melt stream of moldable material from auxiliary injection unit 102, represented by injection cycle profile (2), over time T having preselected injection stage feedback adjustment as may be provided by the system of FIG. 1 in accordance with a simultaneous co-injection embodiment hereof. Features and aspects of the other embodiments may be used accordingly with the current embodiment. In this embodiment, the injection of the second melt stream of moldable material provided by auxiliary injection unit 102 is varied such as to affect a pressure P thereof in response to a sensed condition of the first melt stream that correlates to various stages of the injection cycle of primary injection unit 104. For example, the injection of the second melt stream may be adjusted when the first melt stream has been sensed to have reached one or more of a preselected maximum injection pressure value $P_{MAX}$, a holding pressure value $P_{HOLD}$, and a decompression pressure value $P_{DECOMP}$ are reached.

In an embodiment hereof, once injection of the first melt stream from primary injection unit 104 reaches a preselected pressure value $P_S$ as sensed by one of direct sensor 114, 114a, 114b, 114g, 114g', a signal will be provided to controller 150 of auxiliary injection unit 102 to start injection of the secondary melt stream. A delay of a time period $T_1$ occurs between commencement of injection by primary injection unit 104 and commencement of injection of auxiliary injection unit 102 that corresponds to the time it takes the pressure P of melt in the first melt stream to reach the preselected pressure value $P_S$. Rather than only sending a single signal to auxiliary injection unit 102 regarding when to commence injection of the second melt stream, as described in some of the embodiments above, controller 150 in accordance with this embodiment continuously monitors the sensed condition of the first melt stream as provided by one of direct sensors 114, 114a, 114b, 114g, 114g' such that the injection cycle of auxiliary injection unit 102 can be continuously varied or adjusted in real time in response thereto at different stages of the injection cycle of primary injection unit 104. In the embodiment shown, once a pressure of the first melt stream as depicted by injection cycle profile (1) reaches a preselected maximum injection pressure value $P_{MAX}$, controller 150 sends a signal to auxiliary injection unit 102 to adjust the injection so as to reduce a pressure of the second melt stream as depicted by injection cycle profile (2) proportionately to that of the first melt stream. In addition or alternatively, once the direct sensor of primary injection unit 104 senses the pressure of the first melt stream is at a preselected holding or packing pressure value $P_{HOLD}$, controller 150 signals auxiliary injection unit 102 to adjust the injection so as to increase the pressure of the second melt stream to a value greater than that of the first melt stream and maintain that pressure until the direct sensor of primary injection unit 104 senses the pressure of the first melt stream is reduced to a preselected decompression pressure value $P_{DECOMP}$, such as during decompression of the system, at which point controller 150 may again signal auxiliary injection unit 102 to adjust the injection so as to reduce the pressure of the second melt stream accordingly.

It would be understood by one of ordinary skill in the art that in view of the disclosure hereof that the injection cycle profiles represented in FIGS. 2-5 and 8 are intended to be by way of example and not limitation as to injection cycles contemplated by the present invention. In addition, it would be understood by one of skill in the art that in view of the disclosure hereof that the preselected value for signaling commencement of auxiliary injection unit 102 could be measured and correlated at any point in the injection cycle of primary injection 104 and not just during the increase in injection pressure shown on injection cycle profile (1) in FIGS. 2-5 and 8. For instance with reference to FIG. 2 pressure P or velocity V of the primary injection may be measured after hitting peak pressure anywhere along the portion of injection cycle profile (1) where pressure and velocity are decreasing.

While various embodiments have been described above, it should be understood that they have been presented only as illustrations and examples of the present invention, and not by way of limitation. Although only one auxiliary injection unit is shown, more than one auxiliary injection unit could be used with an injection molding system if more than one auxiliary material is required by the specific molding application. Also, it should be noted that although each of the embodiments describes an auxiliary injection unit used in conjunction with a molding machine with a primary injection unit, this is also by way of illustration and not limitation.

It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A method of controlling commencement of an injection of a melt stream of moldable material from an auxiliary injection unit comprising the steps of:
    positioning a sensor in an injection molding system to sense a condition related to an injection of a first melt stream of a first moldable material provided by a primary injection unit, wherein the first melt stream flows along a first melt path of the injection molding system; and
    commencing an injection of a second melt stream of a second moldable material from the auxiliary injection unit upon the sensed condition related to the injection of the first melt stream being detected at a preselected value, wherein the second melt stream flows along a second melt path of the injection molding system,
    wherein the step of commencing the injection of the second melt stream is controlled by an auxiliary injection unit controller and a signal from the auxiliary injection unit controller to start the commencing step is independent of a primary injection unit controller.

2. The method of claim 1, wherein the sensor is a direct sensor in direct contact with the first melt stream to sense one of a pressure and a velocity thereof, and the preselected value of the sensed condition is one of a respective preselected pressure value and preselected velocity value.

3. The method of claim 2, wherein the direct sensor is positioned within a melt channel of one of a sprue bushing, a manifold, a mold cavity, and a nozzle of the injection molding system.

4. The method of claim 1, wherein the sensor is an indirect sensor located along an outer surface of a hot runner component of the injection molding system and the preselected value of the sensed condition is a measurable movement of the respective hot runner component that is related to the respective hot runner component receiving the injection of the first melt stream by the primary injection unit.

5. The method of claim 4, wherein the hot runner component is one of a sprue busing, a manifold and a nozzle of the injection molding system and the measurable movement is a flexing or distortion of the one of the manifold and the nozzle.

6. The method of claim 1, wherein the sensor is a functional sensor and the preselected value of the sensed condition is the detection of an occurrence of a function within the injection molding system that is related to the injection of the first melt stream by the primary injection unit.

7. The method of claim 6, wherein the functional sensor is a position sensor for detecting the occurrence of a valve pin actuator moving to a preselected position.

8. The method of claim 6, wherein the functional sensor is a strain gauge mounted on a sprue bushing of the injection molding system for detecting the occurrence of the primary injection unit being brought into contact with the sprue bushing to commence the injection of the first melt stream.

9. The method of claim 1, further comprising:
    positioning a safety feedback sensor in the injection molding system, wherein the safety feedback sensor is for confirming that the injection of the first melt stream by the primary injection unit has occurred.

10. The method of claim 1, wherein when the sensed condition is detected to be at the preselected value a signal is sent that directly commences the injection of the second melt stream from the auxiliary injection unit.

11. The method of claim 1, wherein when the sensed condition is detected to be at the preselected value a signal is sent that delays commencement of the injection of the second melt stream from the auxiliary injection unit for a preset time period.

12. The method of claim 1, wherein the injection molding system is configured for one of a co-injection and multi-material molding operation.

13. A method of controlling commencement of an injection of a melt stream of moldable material from an auxiliary injection unit comprising the steps of:
    positioning a sensor along a first melt path of a hot runner injection molding system that receives an injection of a first melt stream of a first moldable material from a primary injection unit, wherein the sensor is positioned to sense a condition of the first melt stream and the sensor is coupled to an auxiliary injection unit controller; and commencing an injection of a second melt stream of a second moldable material from the auxiliary injection unit upon receiving a signal from the auxiliary injection unit controller upon the condition of the first melt stream being detected at a preselected value, wherein the second melt stream flows along a second melt path of the hot runner injection molding system and wherein the signal from the auxiliary injection unit controller to start the commencing step is independent of a primary injection unit controller.

14. The method of claim 13, wherein the sensed condition of the first melt stream is one of pressure and velocity and the preselected value of the sensed condition is one of a respective preselected pressure value and preselected velocity value.

15. The method of claim 14, wherein the sensed condition of the first melt stream is pressure and after the preselected pressure value is reached and the step of commencing an injection from the auxiliary injection unit has occurred, the method further comprises the step of:

continuously monitoring the pressure of the first melt stream to determine when at least one of a maximum injection pressure value, a holding pressure value and a decompression pressure value is reached; and adjusting the injection of the second melt stream from the auxiliary injection unit when the first melt stream reaches at least one of the maximum injection pressure value, the holding pressure value and the decompression pressure value.

16. The method of claim 13, wherein after the step of commencing an injection from the auxiliary injection unit has occurred, the method further comprises the step of:

continuously monitoring the sensed condition of the first melt stream at preset time intervals; and adjusting the injection of the second melt stream from the auxiliary injection unit based on the sensed condition of the first melt stream at one or more of the preset time intervals.

17. The method of claim 13, wherein the sensor is in direct contact with the first melt stream.

18. The method of claim 17, wherein the sensor is positioned in the hot runner injection molding system to contact the first melt stream within a melt channel of one of a sprue bushing, a manifold, a mold cavity, and a nozzle of the hot runner injection molding system.

19. The method of claim 13, wherein when the sensed condition of the first melt stream is detected at the preselected value a signal is sent that directly commences the injection of the second melt stream from the auxiliary injection unit.

20. The method of claim 13, wherein when the sensed condition of the first melt stream is detected at the preselected value a signal is sent that delays the commencement of the injection of the second melt stream from the auxiliary injection unit for a preset time period.

21. The method of claim 13, further comprising:

positioning a safety feedback sensor in the injection molding system, wherein the safety feedback sensor is for confirming that the injection of the first melt stream by the primary injection unit has occurred.

22. The method of claim 13, wherein the injection molding system is configured for one of a co-injection and multi-material molding operation.

* * * * *